May 13, 1924.

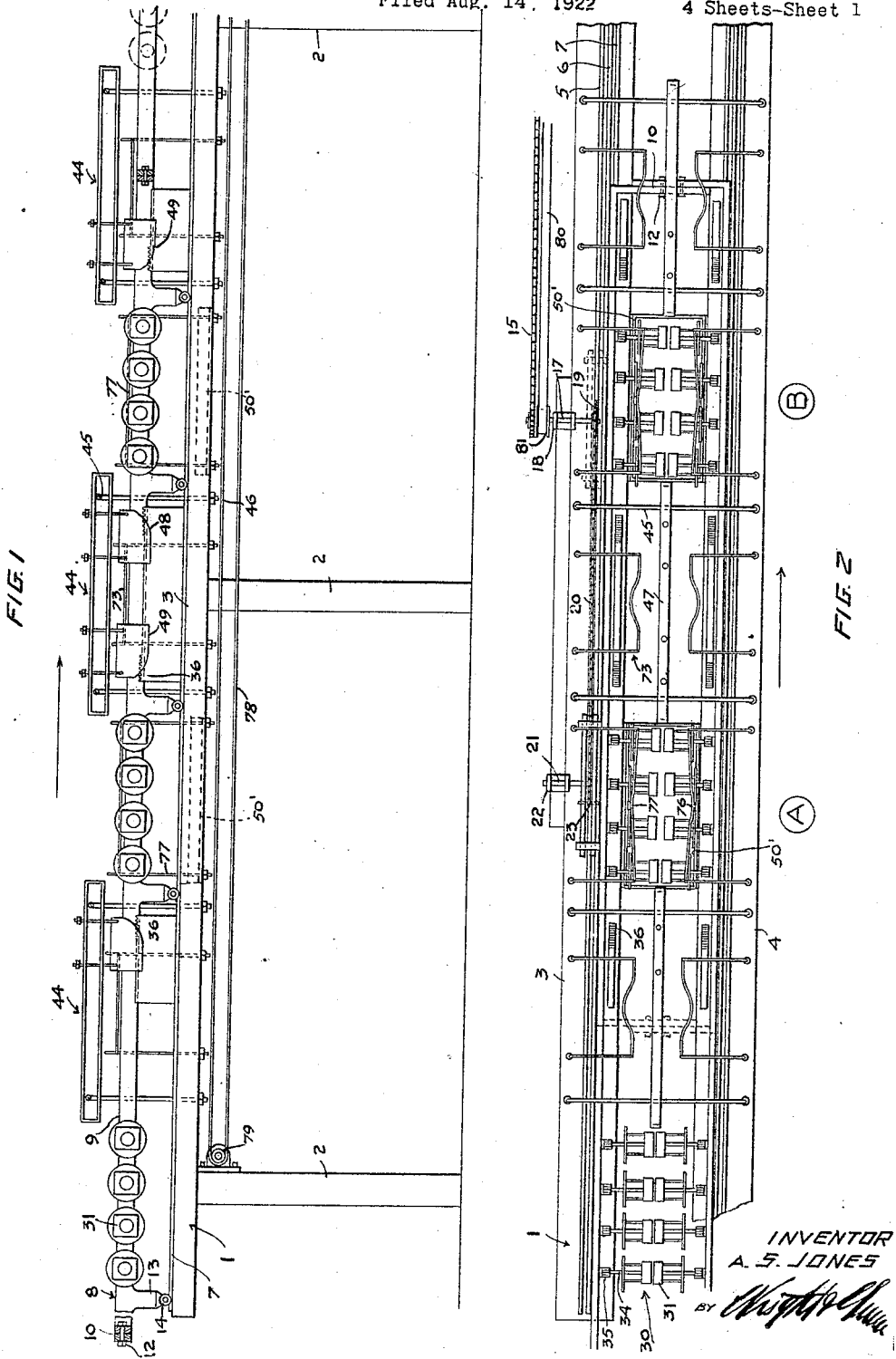

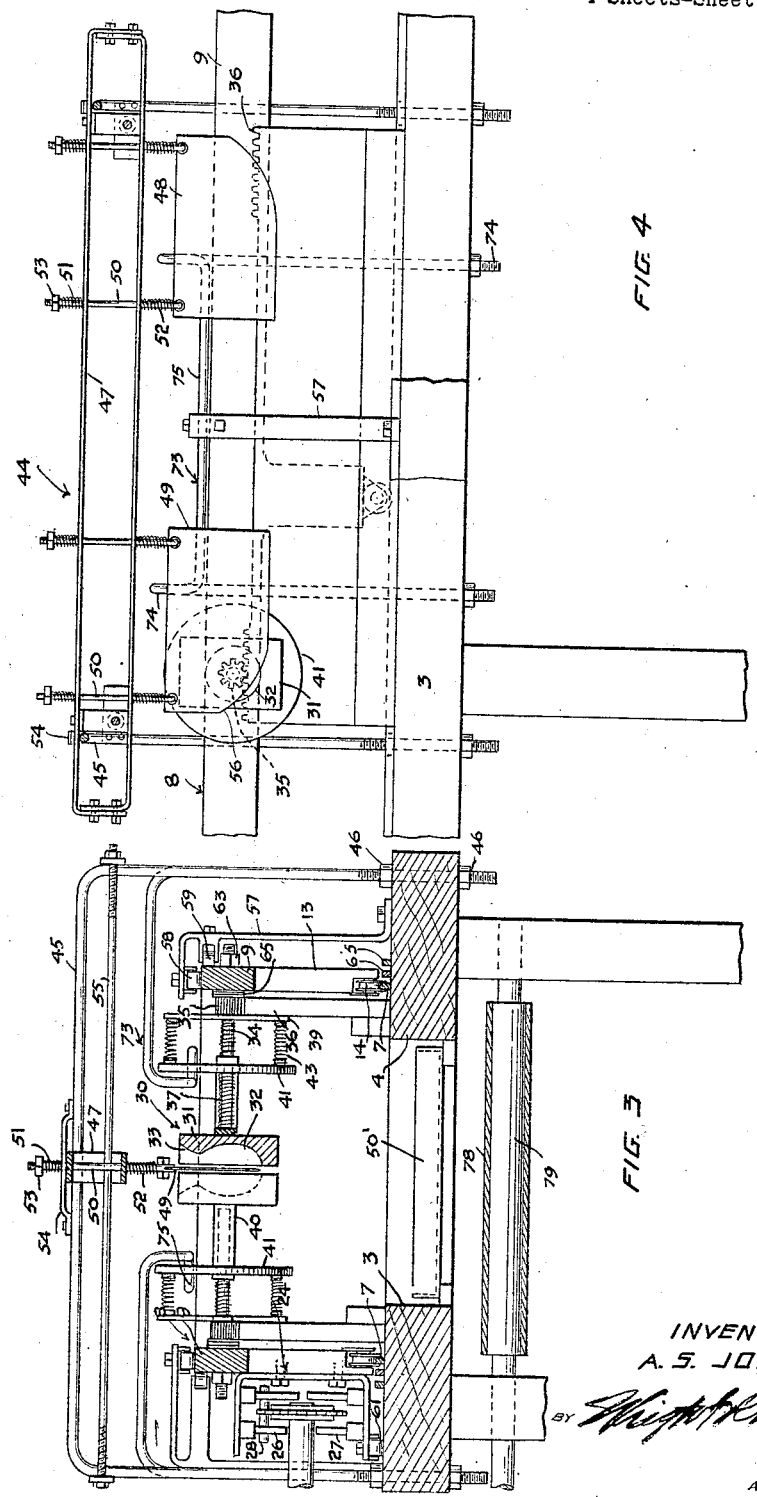

A. S. JONES

FRUIT CUTTING MACHINE

Filed Aug. 14, 1922

INVENTOR
A. S. JONES

ATT'YS.

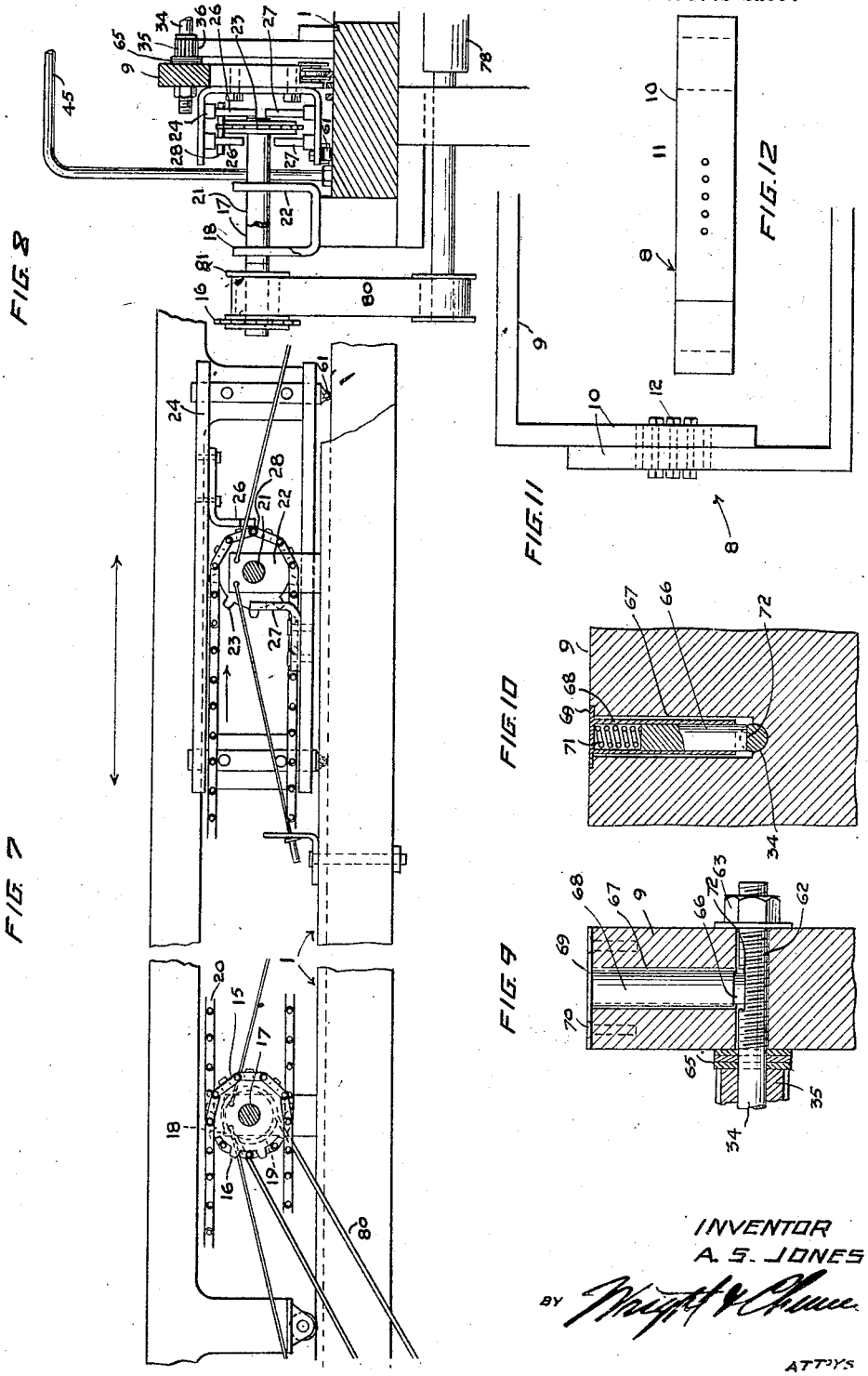

Patented May 13, 1924.

1,493,676

UNITED STATES PATENT OFFICE.

ADRIAN S. JONES, OF REDWOOD CITY, CALIFORNIA.

FRUIT-CUTTING MACHINE.

Application filed August 14, 1922. Serial No. 581,603.

*To all whom it may concern:*

Be it known that I, ADRIAN S. JONES, a citizen of the United States, residing at Redwood City, in the county of San Mateo and State of California, have invented new and useful Improvements in Fruit-Cutting Machines, of which the following is a specification.

This invention relates to improvements in apparatus for slicing fruit preparatory to canning or drying operations and resides in the provision of a simply constructed and comparatively inexpensive apparatus by means of which a large quantity of whole fruit may be cut or sliced into halves in a comparatively short time and without requiring the employment of as many operators or attendants as is usually required in slicing fruit, whereby a reduction in the cost of cutting or halving fruit in large quantities will be provided for.

An object of the invention is to provide a fruit slicing machine which may be economically and easily operated, which may be readily adjusted to slice different kinds of fruit and fruit of different sizes and shapes and which will separate the seed or pits from the meat of the fruit.

Another object is to provide novel devices for holding individual pieces of fruit and properly presenting such pieces to slicing knives, also means for operating the fruit holding devices to open them for reception of fruit pieces and to cause them to release the fruit after a slicing operation.

The invention possesses other advantages and features some of which, with the foregoing will be set forth at length in the following description where I shall outline in full that form of the invention which I have selected for illustration in the drawings accompanying and forming a part of the present specification. In said drawings I have shown one form of the construction of my invention, but it is to be understood that I do not limit myself to such form since the invention as expressed in the claims may be embodied in a plurality of forms.

Referring to the drawings:

Fig. 1 represents a fragmentary side elevation of a fruit slicing machine constructed in accordance with my invention.

Fig. 2 represents a fragmentary top plan view of the machine of my invention.

Fig. 3 is an enlarged cross sectional view showing in detail certain parts of the fruit holding and slicing machine.

Fig. 4 is an enlarged fragmentary side elevation of the mechanism shown in Fig. 3.

Fig. 7 is a fragmentary enlarged side elevation of a part of the carriage operating mechanism.

Fig. 8 is a fragmentary vertical section of the mechanisms shown in Fig. 7.

Fig. 9 is a fragmentary vertical sectional view of the automatic stop and detent for controlling the rotation of the fruit holding devices.

Fig. 10 is a sectional view of the mechanism of Fig. 9, taken at right angles to Fig. 9.

Fig. 11 is a fragmentary plan view of the means for adjusting the carriage frame.

Fig. 12 is an elevation of the carriage frame as shown in Fig. 11.

Figure 5:
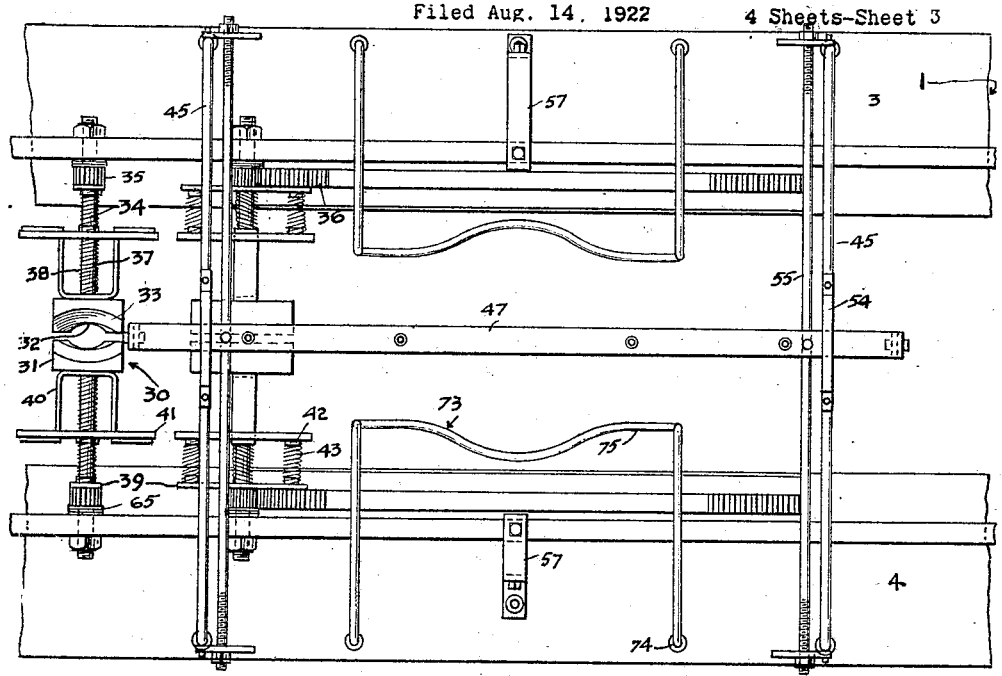
Fig. 5 is an enlarged top plan view of the mechanism shown in Figs. 3 and 4.
Figure 6:
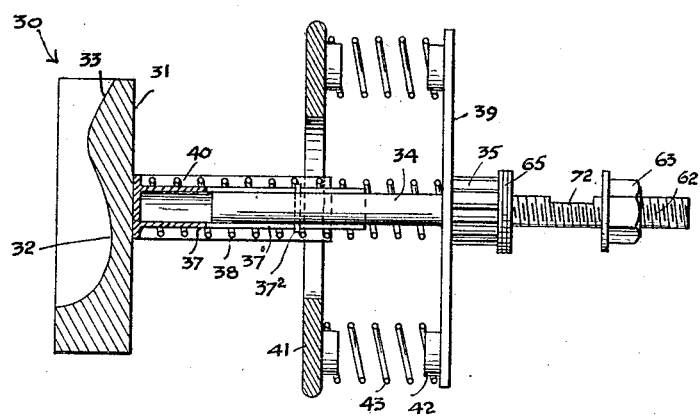
Fig. 6 is an enlarged vertical sectional view of one half of one of the fruit holding devices.

Referring in detail to the embodiment of the invention shown in the accompanying drawings, 1 designates an elongated support having suitable legs 2, which support comprises essentially two longitudinal bars 3 and 4, which may be suitably braced as desired, and each of which supports upon its upper side a plurality of parallel tracks, there being in this instance three, designated 5, 6 and 7, which tracks are spaced apart slightly. A carriage generally designated 8 is arranged so as to be reciprocal upon the support 1 and comprises a rectangular frame 9 in two pieces, the extremities 10 of which are overlapped and provided with registering openings 11 through which removable fastening elements 12 are to be inserted. Through this arrangement the width of the carriage is adjusted for the purpose of varying the operation of certain parts of the machine as will be later described. Extending downwardly from the carriage are arms 13 upon the lower ends of which flanged rollers 14 are mounted, which rollers are adapted to engage upon the pair of rails 5, or upon increase in width, upon the other pairs of rails 6 and 7. While I have shown three rails, any number thereof may be used depending upon the requirements as to the adjustment of the carriage.

The carriage is reciprocated upon a support therefor by drive mechanism which is operated from a motor or other source of power, not shown, through a drive sprocket chain 15, part of which is shown, said drive sprocket chain being arranged upon a sprocket wheel 16 which is fixed to a shaft 17 mounted in bearings 18, which latter extend upwardly from the frame or support 1. Upon its inner end the shaft 17 supports a sprocket wheel 19 upon which is mounted a sprocket chain 20. A shaft 21 corresponding to the shaft 17 is mounted in bearings 22 arranged as are the bearings 18 and upon its inner end supports a sprocket wheel 23, upon which wheel the chain 20 is mounted. Fixed upon the side of the carriage is a skeleton frame 24 which has portions overlying upper and lower runs of the chain 20 and provided adjacent the sprockets 23 and 19 with upper and lower pairs of projections 26 and 27. The chain 20 is provided with a transverse pin 28 which is adapted to engage the projections 26 and 27 during rotation of the chain so as to reciprocate the carriage. Assuming that the chain is traveling in the direction of the arrow shown in Fig. 7, with the pin in engagement with the projections 26, when the pin passes over the sprocket 23, the projections 26 are moved away from the sprocket and the pin moved free of said projections and upon the lower side of said sprocket whereupon it will immediately engage the projections 27 and move said projections, frame and carriage in the opposite direction. At the other sprocket 19, the projection performs in the same manner so that the carriage is reciprocated continuously upon rotation of the chain.

The carriage is provided at a plurality of spaced points with a series of fruit holding devices generally designated 30, there being four or more of said devices in each series, or as many as desired, depending upon the size of the machine. Each of the devices 30 comprises a pair of block jaws 31 provided in opposed faces with registering recesses 32 substantially semi-spherical in shape and having outwardly flared openings 33 at the upper ends of said recesses. When the jaws are brought together they form a substantially spherical pocket for reception of fruit pieces, which pockets are flared at their upper end. The jaws 30 are mounted on rotary shafts 34, which shafts are journaled in suitable bearings in opposite sides of the carriage and have mounted thereon, adjacent said bearings, pinions 35. The pinions 35 are adapted to engage rack bars 36 which are fixed to the support 1, and of such length as to cause rotation of the devices 30 throughout the period of engagement of the fruit with the cutting means to be later described.

Each jaw 31 has a sleeve 37 which telescopes the shaft 34 and is longitudinally adjustable thereon, there being a longitudinal slot 37' in said sleeve in which engages a pin $37^2$ carried by the shaft. A helical expansion spring 38 surrounds the sleeve and at its ends abuts the rear portion of the jaw 31 and a plate 39, which latter is fixed to the shaft 34 adjacent the pinion 35. By this arrangement the jaws 31 are yieldingly pressed into fruit engaging position through the action of the springs. A U-shaped frame 40 is fixed at its bight portion to each block and at its free ends is secured to an annular member 41 which surrounds the sleeve and shaft. Opposite one another on the plate 39 and annular member 41 are portions of bosses 42, which bosses receive expansion springs 43, which serve for the same purpose as the spring 38.

A plurality of cutting devices generally designated 44 are mounted in spaced relation to one another on the support 1. Each of these devices comprises a frame consisting of a pair of inverted U-shaped portions 45, the ends of which are suitably secured, as at 46 to the support 1. A laterally adjustable knife supporting member 47 is supported by the transverse upper portions of the pieces 45. This member comprises upper and lower parallel potions from which are suspended elongated cutting knives 48 and 49, there being two knives for each of the cutting devices 44. The knives are secured to the lower ends of short supporting rods 50, which rods are vertically adjustable in openings formed through the member 47. Expansion springs 51 and 52 are mounted upon each of the rods. The spring 51 engages the upper side of the member 47, and a nut 53 is adjustable upon the upper end of the rod 50. The spring 52 engages the upper edge of the knife and the under side of the member 47. By this arrangement the knives are yieldingly supported in position to engage the fruit carried by the fruit supporting device 30. The knife supporting member 47 is adjustably held in place by guide brackets 54 fastened upon the upper portions of the frame pieces 45, whereby the position of the knives may be varied to correspond with the adjustment of the carriage and said fruit holding members 30, in order that the fruit pieces will be cut through the center. Suitable cross braces 55 are adapted to extend transversely of the members 45 adjacent their upper ends and act as stops against which the outermost guide rods 50 will engage. Each knife blade is bevelled and sharpened as at 56, on its outer end.

To reduce friction and stabilize the movement of the carriage, brackets 57 are fixed to the support 1 and at their upper ends carry rollers 58 and 59, which rollers engage respectively the upper edges and outer sides of the frame pieces. The lower portion of the frame 24 is provided with rollers 61, which engage upon the upper side of the support 1, as shown in Fig. 3.

Each shaft 34 is provided, where journaled in the frame piece 9 of the carriage, with screw threads 62 and a nut 63 is turned upon the outer end of said shaft so as to hold the same in place, there being a washer interposed between the nut and outer face of the member 9. Between the pinion 35 on the shaft and the adjacent face of the member 9 are a plurality of washers 65 upon the removal of one or more of which, the shaft 34 may be longitudinally adjusted and by means of which adjustment the jaws 31 may be likewise adjusted to receive fruit of different sizes. To hold the jaws 31 in position so that the fruit may be readily inserted between them, there is provided an automatic detent member 66, which is vertically slidable in a sleeve 68, which sleeve is mounted in an opening 67 formed in one of the pieces of the frame 9. The sleeve 68 is provided with a head 69 which is countersunk in the upper side of the member 9 and held in place by fastenings 70. An expansion spring 71 is mounted in the sleeve 69 and exerts a downward pressure on the detent 66 so that the latter may be forced into engagement with the flattened recess portion 72 on the shaft 34. When the shaft is in such position that the jaws are apart and ready to receive the fruit, the detent member 66 engages the flattened portions 72 and holds said shaft against accidental or unintentional movement, but when said shaft is moved through engagement of the pinions 35 with the rack bars, the shaft will force the detent 66 upwardly and free movement of the shaft will be permitted through 360°, such as will cause pieces of fruit to be effectively engaged with the knife blades.

On opposite sides of each cutting device 49 are members 73 for engaging the holding devices and forcing them apart after a slicing of the fruit has taken place, whereby fruit will be permitted to drop out of the holding device. These members 73 comprise upright arms 74 fastened to the support 1, and which curve laterally at their upper ends and are joined by a curved rod 75. The rod 75 is so curved and positioned that it will engage the annular members 41 of each holding device 30 and move said members 41 rearwardly against the action of the spring 43, whereby, through the U-shaped member 40, the jaws 31 will be moved apart. The members 75 are so shaped that they will first move the jaws apart and then allow them to come together again through the action of the springs. The members 73 are so positioned that they will work, when the carriage is moving, in both directions. Between the cutting devices are similar spreading members 76 and 77, which devices are arranged so as to spread the jaws of the holding devices 30 apart in order that the operators may readily insert the fruit to be cut between the jaws without bruising or damaging the fruit, said member 76 operating in such manner as the members 73, when the carriage is moved in both directions.

Beneath the support 1 is an endless carrier or draper 78 supported upon rollers 79 and arranged so that its upper run will advance the fruit which has been sliced and dropped out of the holding device 30. One of the rollers 79 is driven by a belt 80 working off of a pulley 81 carried by the shaft 17. The endless belt, only part of which is shown, may be arranged to deliver the sliced fruit into a receptacle or other machine, not shown, as desired.

Assuming that the driving mechanism is under operation and the chain 20 is revolving in the direction of the small arrow shown in Fig. 7, the pin 28 on said chain will engage the upper projections 26 and move them with the carriage in one direction for the length of the chain and will then engage the projections 27 and move the carriage in the opposite direction, thus reciprocating the carriage continuously. Several operators, depending upon the size of the apparatus, stand alongside of the support and with a supply of fruit, not shown, at hand, place the pieces of fruit in the respective holding devices 30. For example, operators standing at the points A and B, shown in Fig. 2, place pieces of fruit, for example, peaches, between the jaws 31 of the holding devices 30 so that said fruit pieces will be supported between the pairs of jaws in the registering recesses 32. It will be noted that when the devices 30 are ready for reception of the fruit they are in upright position as provided for by the upright detent members 66, and are slightly spread apart by the action of the spreading devices 76 and 77 against the annular members 41. Assuming that the carriage is to be moved in the direction of the arrow shown in Figs. 1 and 2, as the jaws 31 move past the members 76 and 77, they spread apart to a greater extent, as shown in Fig. 2, to permit of an easy depositing of the fruit into the jaws without bruising or damaging the fruit. As the carriage continues to move the members 30 of the middle and end series, shown in Fig. 2, are moved towards the cutting devices 44, to the right of such series, and bring the fruit into contact with the knives 49. As said members 30 are advanced towards the knives 49 and substantially co-incident with the movement of each of said members 30, successively between a point beneath the knives, the pinions 35 will engage with the rack members 36 and rotate said members 30 so that as the pieces of fruit in the members engage the knives, they are turned and the knives will thereby slice completely around each piece of fruit while cutting through the center of the fruit, the knives yielding upwardly, due to their pressure against the fruit through the action of the springs 51 and 52. The length of the rack bar is such as to cause one complete revolution of the fruit pieces in each member 30, and the length of the blade is such as will cause a slicing action throughout its rotation and movement of the fruit. As soon as the fruit has been cut and each of the members 30 move away from the knives 49, in continuation of the advancement of the carriage, the spreader members 73 will engage the annular members 41 and move the jaws 31 of each holding device apart whereby the sliced fruit will be dropped onto the draper or endless belt 78 and be carried off to a point where the fruit is to be further treated for canning or drying purposes. Thus, it will be seen that the movement of the table is such as will bring the respective holding devices with individual fruit pieces therein, of certain series of said devices into contact with certain of the knives during the movement of said carriage in one direction. Upon movement of the carriage in the other direction or the return movement, the holding devices of other series are brought into play to provide the slicing or cutting action. Thus, the operators at A and B and at other points along the apparatus may, as soon as the members 73 spread apart, the jaws deposit the fruit in the holders. Other series of the members 30 have fruit deposited therein during the beginning of the return movement so that upon said return movement, the fruit will be brought into engagement with the knives 48 and the holders rotated so as to slice around the pieces of fruit. The first named series upon this return movement, in moving past the spreaders 75 and 76, upon the return movement of the carriage, will cause the jaws to move apart so that fruit may be placed in the holders, and the holders of this series are moved upon continuation of the return movement of the carriage until engagement with the knives 48. It will thus be seen that upon movement of the reciprocatory carriage in both directions, a slicing of fruit will take place and in this way provision is made for full utilization of the action of the mechanism. I do not wish to limit myself to the arrangement of the holding and cutting devices shown, since I may arrange them in any manner provided that upon both movements of the carriage, a cutting or slicing action will take place.

Suitable receptacles 50' are located in the main frame beneath the points at which the operation places the fruit in the holding devices so that in case pieces of fruit are dropped they will be caught in said receptacle and not be mixed with the sliced fruit which is dropped on the endless conveyor.

I claim:

1. A fruit cutting machine comprising a reciprocatory carriage, a track upon which said carriage operates, means for reciprocating the carriage, a plurality of slicing knives supported by the carriage track, a plurality of series of holders for individual pieces of fruit mounted on the carriage so as to bring the fruit supported thereby into engagement with the knives upon movement of the carriage.

2. A fruit cutting machine comprising a reciprocatory carriage, a track upon which said carriage operates, means for reciprocating the carriage, a plurality of slicing knives supported by the carriage track, a plurality of series of holders for individual pieces of fruit mounted on the carriage so as to bring the fruit supported thereby into engagement with the knives upon movement of the carriage in both directions.

3. A fruit cutting machine comprising a reciprocatory carriage, a track upon which said carriage operates, means for reciprocating the carriage, a plurality of slicing knives supported by the carriage track, a plurality of series of holders for individual pieces of fruit mounted on the carriage so as to bring the fruit supported thereby into engagement with the knives upon movement of the carriage and means which after each fruit holding device has moved past a knife will automatically release the fruit from said holding device.

4. A fruit cutting machine comprising a reciprocatory carriage, a track upon which said carriage operates, means for reciprocating the carriage, a plurality of slicing knives supported by the carriage track, a plurality of series of holders for individual pieces of fruit mounted on the carriage so as to bring the fruit supported thereby into engagement with the knives upon movement of the carriage and means for rotating the holding devices only during the time of engagement of fruit with the knives.

5. A fruit cutting machine comprising a reciprocal carriage, a track upon which said carriage reciprocates, means for reciprocating the carriage, a plurality of fruit engaging and supporting members mounted on the carriage and arranged to hold individual pieces of fruit, a plurality of knives into engagement with which the fruit supported by said members is moved upon reciprocation of the carriage, means for releasing the fruit from the holders after engagement of the fruit with the knives and an endless conveyor onto which the fruit is dropped upon release thereof from the holder.

6. A fruit cutting machine comprising a reciprocal carriage, a track upon which said carriage reciprocates, means for reciprocating the carriage, a plurality of fruit holders mounted on the carriage and arranged to contain individual pieces of fruit, a plurality of knives into engagement with which the fruit supported by said holders is moved upon reciprocation of the carriage and means for rotating the holders and fruit during engagement of the fruit with the knives.

7. A fruit cutting machine comprising a reciprocal carriage, a track upon which said carriage reciprocates, means for reciprocating the carriage, a plurality of fruit holders mounted on the carriage and arranged to contain individual pieces of fruit, a plurality of knives into engagement with which the fruit supported by said holders is moved upon reciprocation of the carriage, each of said holders comprising opposed jaws movable towards and away from one another and having registering fruit receiving recesses in opposed faces, rotatable shafts, means for rotatably and longitudinally slidably securing said jaws to said shafts, and spring means for forcing said jaws towards one another.

8. A fruit cutting machine comprising a reciprocal carriage, a track upon which said carriage reciprocates, means for reciprocating the carriage, a plurality of fruit holders mounted on the carriage and arranged to contain individual pieces of fruit, a plurality of knives into engagement with which the fruit supported by said holders is moved upon reciprocation of the carriage, each of said holders comprising opposed jaws movable towards and away from one another and having registering fruit receiving recesses in opposed faces, rotatable shafts, means for rotatably and longitudinally slidably securing said jaws to said shafts, spring means for forcing said jaws towards one another and means automatically moving said jaws away from one another against the action of said springs as the jaws move away from said knives after a cutting operation of the fruit to release the fruit from the holders.

9. A fruit cutting machine comprising a plurality of holders for individual pieces of fruit, a plurality of knives, means for moving the holders so as to bring the fruit supported therein into engagement with the knives, each of said holders comprising opposed jaws having registering fruit receiving recesses, opposed jaws having registering fruit receiving recesses in opposed faces, shafts upon which said jaws are revolvable and movable towards and away from one another, means for rotating the shafts and jaws at the time of engagement with the fruit between the jaws with the knives, spring means normally tending to hold said jaws in fruit supporting position and means for automatically forcing said jaws apart to release the fruit subsequent to engagement of the pieces of fruit with the knives.

10. A machine for cutting fruit comprising a plurality of holders for individual pieces of fruit, means for supporting said holders, a plurality of knives, means for moving said supporting means to bring the holders into position to cause engagement of the fruit with the knives, each of said holders comprising opposed fruit engaging jaws, rotary shafts carried by said holder supporting means, means for longitudinally slidably and rotatably connecting the jaws with the shafts, spring means normally holding said jaws in fruit engaging position, means operating automatically upon movement of said jaws in one direction to open upon movement of said holding devices to spread said jaws apart for reception of said pieces of fruit and similar means for spreading apart said jaws to release the fruit subsequent to the cutting of the fruit by the knives.

11. A fruit cutting machine comprising a reciprocatory carriage, a track upon which said carriage operates, means for reciprocating the carriage, a plurality of slicing knives disposed in operative relation to the carriage, a plurality of holders for individual pieces of fruit mounted on the carriage in such manner as to bring the fruit supported thereby into engagement with the knives upon movement of the carriage.

ADRIAN S. JONES.